United States Patent
Goetschalckx et al.

(10) Patent No.: US 9,767,493 B2
(45) Date of Patent: Sep. 19, 2017

(54) CUSTOMER CHECK RETRIEVAL

(71) Applicant: NCR Corporation, Duluth, GA (US)

(72) Inventors: Eric Goetschalckx, Atlanta, GA (US); Taylor Morgan, New York, NY (US); Andrew Smith, Atlanta, GA (US); Yen-Nien Wu, Atlanta, GA (US)

(73) Assignee: NCR CORPORATION, Duluth, GA (US)

( * ) Notice: Subject to any disclaimer, the term of this patent is extended or adjusted under 35 U.S.C. 154(b) by 0 days.

(21) Appl. No.: 14/446,560

(22) Filed: Jul. 30, 2014

(65) Prior Publication Data

US 2016/0034985 A1 Feb. 4, 2016

(51) Int. Cl.
| | |
|---|---|
| *G06Q 40/00* | (2012.01) |
| *G06Q 30/04* | (2012.01) |
| *G06Q 30/06* | (2012.01) |
| *G06Q 50/12* | (2012.01) |
| *G06Q 20/32* | (2012.01) |

(52) U.S. Cl.
CPC ......... *G06Q 30/04* (2013.01); *G06Q 20/3224* (2013.01); *G06Q 30/0601* (2013.01); *G06Q 50/12* (2013.01)

(58) Field of Classification Search
CPC ...... G06Q 50/12; G06Q 20/32; G06Q 20/322; G06Q 20/327; G06Q 20/30; G06Q 20/0601; G06Q 20/0633; G06Q 20/0635; G06Q 20/3224
USPC .................................... 235/379, 383; 705/15
See application file for complete search history.

(56) References Cited

U.S. PATENT DOCUMENTS

| | | | |
|---|---|---|---|
| 8,498,900 B1* | 7/2013 | Spirin | G06Q 50/00 340/286.09 |
| 9,117,231 B2* | 8/2015 | Rodgers | G06Q 30/06 |
| 9,152,999 B2* | 10/2015 | Argue | G06F 17/30 |
| 2007/0088620 A1* | 4/2007 | Tengler | G06Q 10/087 705/15 |
| 2009/0037286 A1 | 2/2009 | Foster | |
| 2011/0191196 A1* | 8/2011 | Orr | G06Q 20/322 705/17 |

(Continued)

OTHER PUBLICATIONS

The technical aspects of the claimed invention relate to the use of general-purpose data processing technology for processing data of an inherently non-technical nature. The information technology employed is considered to be generally known. See also Official Journal Nov. 2007, p. 592 XP007905525.

(Continued)

*Primary Examiner* — Thien M Le
*Assistant Examiner* — April Taylor
(74) *Attorney, Agent, or Firm* — Schwegman Lundberg & Woessner, P.A>

(57) ABSTRACT

Various systems, methods, and apparatuses are described for retrieving a customer check. One example method may comprise generating a list of items included on at least one open check. The example method may further comprise receiving from a customer a selection of an item from the list, wherein the item is included on a check associated with the customer. The example method may further comprise identifying the check associated with the customer based at least in part on the selected item. Similar and related methods, apparatuses, systems, and computer program products are also provided.

20 Claims, 4 Drawing Sheets

(56) References Cited

U.S. PATENT DOCUMENTS

| | | | |
|---|---|---|---|
| 2014/0122345 A1* | 5/2014 | Argue | G06Q 30/04 705/304 |
| 2014/0244409 A1* | 8/2014 | Nathanel | G06Q 50/12 705/15 |
| 2014/0324606 A1* | 10/2014 | Fortuna | G06Q 50/12 705/15 |
| 2015/0213565 A1* | 7/2015 | Garrett | G06Q 50/12 705/15 |

OTHER PUBLICATIONS

European Search Report issued in co-pending European patent application EP 15167858.8 dated Oct. 14, 2015.

* cited by examiner

CUSTOMER CHECK RETRIEVAL

BACKGROUND OF THE INVENTION

The advancement of technology has broadened the capabilities of devices, creating opportunities for new and advanced solutions to common problems. Establishments, such as retailers and food service providers, want to provide fast, reliable service to their customers using the latest technologies while keeping costs down. Similarly, customers want to use the latest technology to simplify their transactions at these establishments while maintaining privacy and security.

Customers frequently wish to use their own mobile devices to facilitate, modify, and pay for their transactions. To do so, however, customers must first locate and retrieve the check generated by the establishment associated with their transaction. Customers may not be aware of an identification number associated with their checks to facilitate retrieving the check. Additionally, establishments do not want to allow their customers to view all of the checks generated for all of the establishment's customers.

Accordingly, it may be desirable to provide a method for retrieving a customer check that does not require special identifiers to be known by the customer and that does not create security and privacy issues for the establishment thereby avoiding the above, and other, drawbacks associated with the current art.

BRIEF SUMMARY OF THE INVENTION

Various embodiments of the present invention provide systems, methods, apparatuses, and computer program products for retrieving a customer check.

An example method for retrieving a customer check may comprise generating a list of items included on at least one open check; receiving from a customer a selection of an item from the list, wherein the item is included on a check associated with the customer; and identifying the check associated with the customer based at least in part on the selected item.

An example method for retrieving a customer check may comprise determining a list of items contained on a plurality of open checks; selecting a subset of the items for presentation to a customer; receiving from the customer a selection from the subset of an item that the customer ordered; and retrieving a check associated with the customer based at least in part on the item selected by the customer.

An example system may comprise a database for storing open checks; and a device for finding a check associated with a customer from the open checks; wherein the device is configured to analyze items included on the open checks and determine representative items for facilitating the search for a particular check; receive input from the customer identifying a representative item included on the check of the customer; and retrieve the check associated with the customer from the database using the input from the customer.

BRIEF DESCRIPTION OF THE DRAWINGS

Having thus described the invention in general terms, reference will now be made to the accompanying drawings, which are not necessarily drawn to scale, and wherein:

DETAILED DESCRIPTION OF THE INVENTION

Various embodiments of the present invention provide a way for customers to identify and retrieve their checks at a retail or restaurant establishment. For example, an application associated with the establishment on the consumer's mobile device may display selected items present on various open checks at the establishment. The customer may select the items that match items that are included on the customer's check (or in some cases that are not included on the customer's check). Based on the customer input, the application may narrow down the list of potential checks until the customer's check may be uniquely identified. Once identified, the customer may be presented with the check in order to buy additional items or pay the check.

Figure 1:
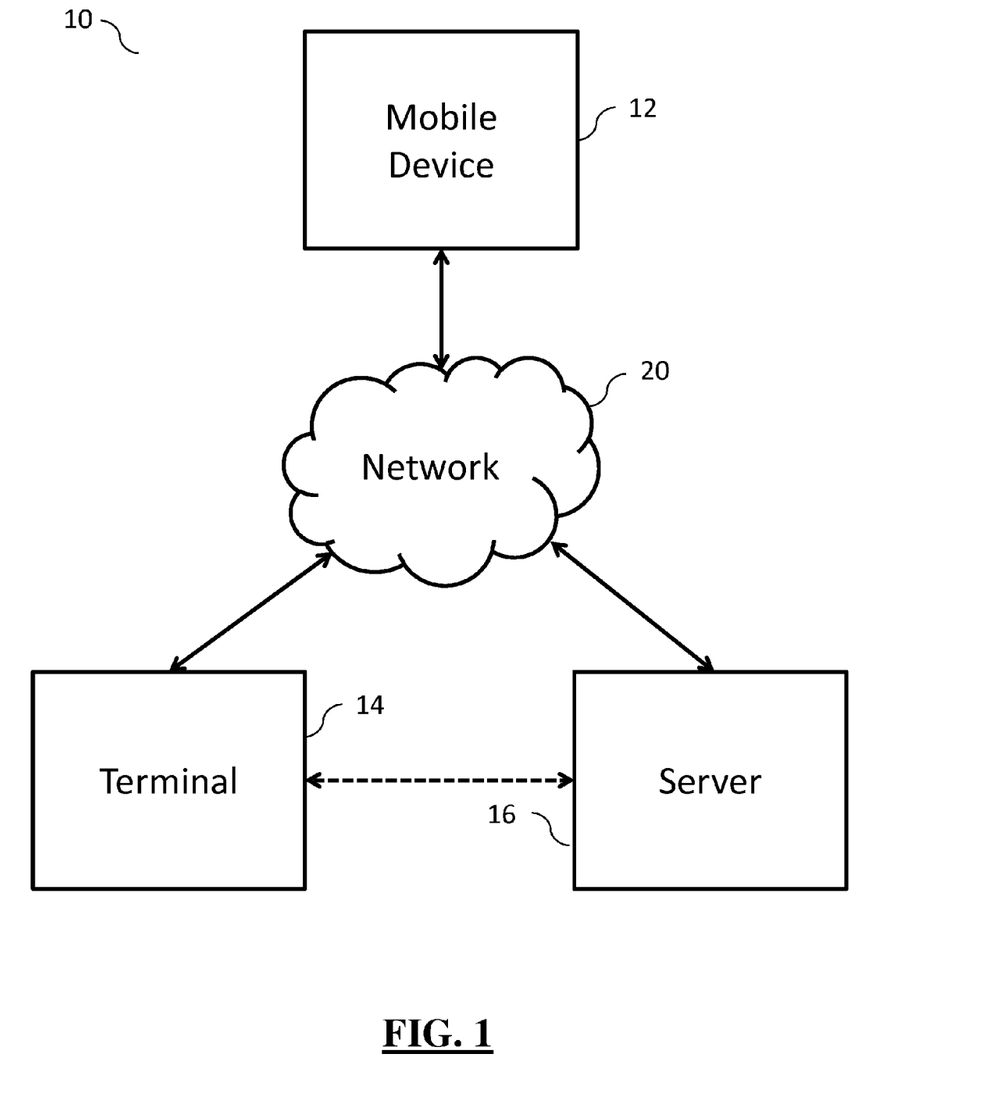
FIG. 1 provides an illustration of one embodiment of an architecture that can be used to practice various aspects of the present invention.

FIG. 1 provides an illustration of a system 10 according to various embodiments of the present invention. An example system 10 may comprise a mobile device 12, terminal 14, and/or a server 16. For instance, a mobile device 12 may comprise a smartphone device, mobile telephone, mobile computer, mobile point-of-sale device, portable digital assistant (PDA), laptop computer, gaming device, electronic tablet, or any other type of similar electronic device; the terminal 14 may comprise a point-of-sale terminal; and/or the server 16 may comprise a point-of-sale server or web server. Certain embodiments may lack one or more of the described entities of the system 10 and/or may have more than one of a particular entity.

The various entities of the system 10 may be in communication with one another, for example via network 20. Network 20 may comprise wired and/or wireless connections.

In various embodiments, the system 10 may be implemented at an establishment where a commercial transaction takes place, such as a retail or restaurant environment. The establishment may operate a server 16 and one or more terminals 14. In some instances, the server 16 may be at a location separate from the establishment, such as a central office, or separate from the terminals 14, such as a back office. The establishment may have one or more customers. Some of the customers of the establishment may possess a mobile device 12. The mobile devices 12 of the customers may interact with the terminals 14 and/or servers 16. For example, the mobile devices 12 may be configured to execute an application associated with the establishment that provides functionality associated with the establishment to the customer.

It should be noted that other system architectures are contemplated that may be used to practice various aspects of the invention. Thus, the system 10 provided in FIG. 1 is for illustrative purposes only and should not be construed to limit the scope of the invention. Further, while FIG. 1 illustrates certain system entities as separate, standalone entities, the various embodiments are not limited to this particular architecture.

Turning to the operation of the system 10, in various embodiments, a customer or patron of the establishment may take part in a transaction. For example, the customer may participate in a transaction to purchase one or more retail or food items from the establishment. The customer may participate in the transaction at the establishment, remotely, or via some combination of the two.

At some point prior to completing the transaction, the customer may wish to retrieve a record of the transaction, for example a bill, to facilitate a further action. For example, a customer may have previously placed an order and wish to retrieve the check for payment or to order additional items.

The customer may possess a mobile device 12 configured to execute an application, such as a mobile or web app, associated with the establishment. The mobile device 12 may receive a request from the customer to retrieve the customer's check.

The request may comprise an indication of the location of the customer and/or mobile device 12. For example, the request may comprise an indication of the name and/or address of the establishment where the customer is present. In other embodiments, the mobile device 12 may determine the location of the customer and/or mobile device 12 via location services, such as Global Positioning System (GPS), triangulation, beaconing, and/or the like.

The mobile device 12 may identify the establishment where the customer is present. For example, the mobile device 12 may identify the establishment based on customer input, such as a selection of the establishment from a list. In some instances, the mobile device 12 may identify the establishment based at least in part on location information. The mobile device 12 may confirm that the customer is located within a predetermined distance of the establishment before permitting the customer to attempt to locate and access an open check.

According to various embodiments, the mobile device 12 may be configured to identify the open checks at the identified establishment. An open check may be a check that has been created for a customer but has not yet been closed. For example, a check may be opened when a customer begins a transaction and may be closed when the customer completes the transaction, such as by completing payment for the transaction.

The mobile device 12 may be configured to determine whether any of the open checks are identical. If any open checks are identical, the mobile device 12 may flag the identical checks. In this regard, if the customer attempts to retrieve a check that is identical to another check at the same establishment, the check may be flagged to prompt further action to avoid the customer retrieving another customer's identical check instead of her own.

In example embodiments, the mobile device 12 may generate a list of the items included on any of the open checks at the establishment. The mobile device 12 may identify the frequency with which each item appears on open checks. For example, the mobile device 12 may determine that four open checks contain the item "hamburger."

The mobile device 12 may select a list of items contained on the open checks to facilitate the customer identifying her check. In particular, the customer may identify which of the selected items do or do not appear on their check. Each item selected by the mobile device 12 may be contained on multiple open checks or only on a single open check.

According to various embodiments, the mobile device 12 may exclude any item contained on every open check from the list of selected items. An item contained on every open check provides no assistance in identifying a particular open check.

In some instances, the mobile device 12 may select the most common items across the open checks. In these instances, the customer may be more likely to identify an item included on their check. If the most common items are not included on the customer's check, it may be easier for the mobile device 12 to reduce the list of candidate checks more quickly.

In other instances, the mobile device 12 may select the least common items across the open checks. In these instances, the check may be located quickly if the customer identifies one of the least common items as an item on her check. Or if the least common items are not included on the customer's check, the list of candidate checks may be reduced. In an instance in which one of the least common items is unique to a single check, the customer's identification of that unique item as an item on her check is sufficient to identify the check.

In yet other instances, the mobile device 12 may select the most expensive items, the largest items, and/or the like. In these instances, the customer may be more likely to recall ordering the expensive or large items.

In other instances, the mobile device 12 may select items of a particular type. For example, in a restaurant setting, the mobile device 12 may select main course entrees. In another example, in a retail clothing store, the mobile device 12 may select accessories.

Other techniques may be used by the mobile device 12 to select the items that facilitate the customer quickly and easily locating her check. In some embodiments, a combination of techniques may be used. For example, the selected list may comprise both the most common and the most expensive items contained on the open checks. In other embodiments, different techniques may be used sequentially. For example, the mobile device 12 may first select the most common items, and after receiving customer input on those items the mobile device 12 may next select the least common items from the remaining open checks.

In example embodiments, the mobile device 12 may include false items in the list of items (e.g., for security purposes). For example, the mobile device 12 may include items in the list that do not appear on any open checks. In another example, the mobile device 12 may include items not offered by the establishment. In these examples, the items may sound similar to other items offered by the establishment, may be realistic items that are not available, may be of the same type of items provided by the establishment, and/or the like.

According to various embodiments, the mobile device 12 may be configured to present the list of items to the patron. In this way, the patron may identify whether one or more items on the list are included or are not included on the customer's check.

In example embodiments, the mobile device 12 may present the list of items to the customer one item at a time. In other embodiments, the mobile device 12 may present a group of items at the same time, for example three to five items at a time.

The mobile device 12 may present the items to the customer in a particular order. In some instances, the list may be ordered according to one of the criteria described above. In other instances, the list may be sorted based on alternating among multiple criteria. In yet other embodiments, the order of the list may be determined based on an algorithm for helping a customer to locate a check efficiently.

The mobile device 12 may include additional information to help the patron identify or recognize the items in the list. For example, the mobile device 12 may present along with each item an image or photo of the item, a description of the item, the price of the item, and/or the like.

According to certain embodiments, the mobile device 12 may be configured to receive input from the customer related to one or more items on the list. The input may be received via an interface provided by the mobile device 12.

In embodiments where the mobile device 12 presents items to the customer one at a time, the mobile device 12 may permit the customer to input whether the item is included on the check, is not included on the check, or if the customer does not know or wishes to skip the item.

In embodiments where the mobile device 12 presents multiple items at a time to the customer, the mobile device 12 may permit the customer to select one or more items at a time to provide input on the selected items. For example, the customer may select multiple items and indicate that all of the selected items are included or are not included on the customer's check.

In some instances, the mobile device 12 may indicate to the customer that the customer should only identify items included on the check or items not included on the check. In these instances, the mobile device 12 may automatically progress to the next item once an item presented is selected.

The mobile device 12 may permit the customer to provide input on the items in a number of ways. In some embodiments, the mobile device 12 may permit the customer to select checkboxes associated with the items and provide input on the selected items simultaneously. In other embodiments, the mobile device 12 may permit the customer to swipe the item left/right or up/down to provide the input. For example, the customer may swipe items not included on her check to the left and swipe items included on her check to the right.

In embodiments where the customer indicates that one of the false items is included on her check, the mobile device 12 may flag the operation. In some instances, the mobile device 12 may terminate the process. The mobile device 12 may alert an employee of the establishment (e.g., a waiter, salesperson, or manager) that a customer has identified a false item as being included on her check.

According to various embodiments, the mobile device 12 may determine that the customer input is sufficient to identify the customer's check. For example, the customer may identify an item or a combination of items included on her check, and the mobile device 12 may determine that the item or combination of items is not included on any other open checks. In another example, the customer may identify an item or a combination of items not included on her check, and the mobile device 12 may determine that the item or combination of items is included on all but one open check.

In other embodiments, the mobile device 12 may determine that no open checks match the customer's input. In these embodiments, the mobile device 12 may display an alert to the customer and/or to an employee of the establishment indicating that no open checks were found matching the customer input. In some instances, the mobile device 12 may permit the customer to restart the identification process.

According to certain embodiments, the mobile device 12 may determine that the customer input is not sufficient to identify the customer's check. In these embodiments, the mobile device 12 may reduce the number of candidate checks from the list of open checks based on the user input. For example, if the customer input indicates that one or more items are included in her check, the mobile device 12 may eliminate all open checks from the list not including the item(s). In another example, if the customer input indicates that one or more items are not included in her check, the mobile device 12 may eliminate all open checks from the list including the item(s). In yet another example, if the mobile device 12 requests the customer to select all presented items included or not included in her check and the customer makes no selection, the mobile device 12 may eliminate any open checks containing or not containing the items, respectively.

The mobile device 12 may repeat the process described above for generating, presenting, and receiving customer input on a new list of items. In this regard, the mobile device 12 may generate the new list of items from the reduced list of open checks. For example, the new list of items to be presented to the customer may no longer contain items present only on open checks that were eliminated based on previous customer input. The mobile device 12 may present the new list to the customer and receive additional customer input. In some instances, the mobile device 12 may be able to identify the customer's check based on the additional customer input. In other instances, the mobile device 12 may need to repeat the process one or more times until the customer's check is identified.

Once the customer's check has been identified, the mobile device 12 may be configured to retrieve the customer's check. The mobile device 12 may present the check to the customer. The customer may provide input to the mobile device 12 confirming that the check is indeed the customer's check.

According to certain embodiments, the mobile device 12 may permit the customer to interact with the check. For example, the mobile device 12 may permit the customer to order or add additional items to the check, cancel the order of certain items, request a bill, pay the check, and/or the like.

Various modifications may be made to the above described embodiments within the scope of the invention. For example, in some embodiments, customers may be permitted to input the name(s) of item(s) they recall from their checks that are not included on the presented list.

In other embodiments, the mobile device 12 may not be the customer's mobile device 12 but rather a mobile device 12 provided by the establishment, such as at the customer's table or at the checkout counter.

In some embodiments, the mobile device 12 may be a fixed device, such as a kiosk, for example placed at the customer's table or at the checkout counter.

Figure 2:
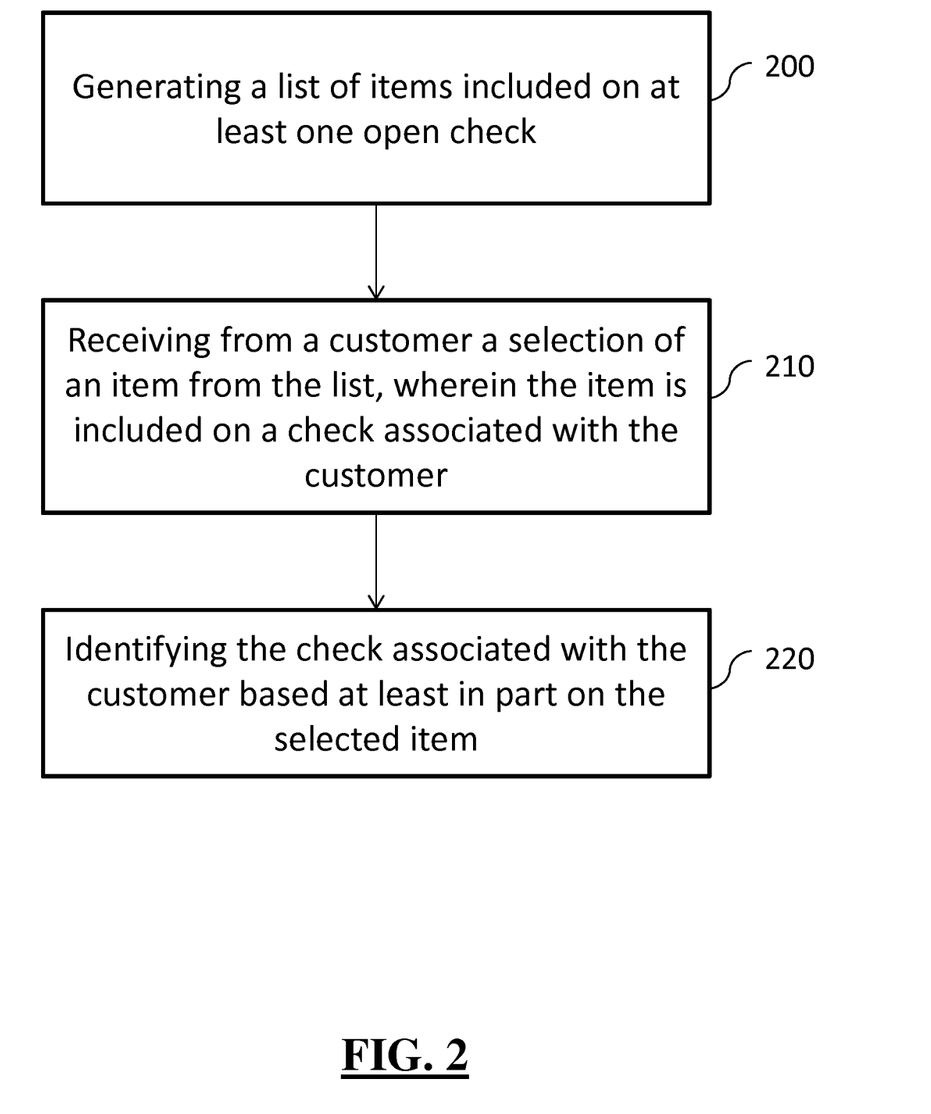
FIG. 2 provides a flowchart for retrieving a customer check according to an embodiment of the present invention.
Figure 4:
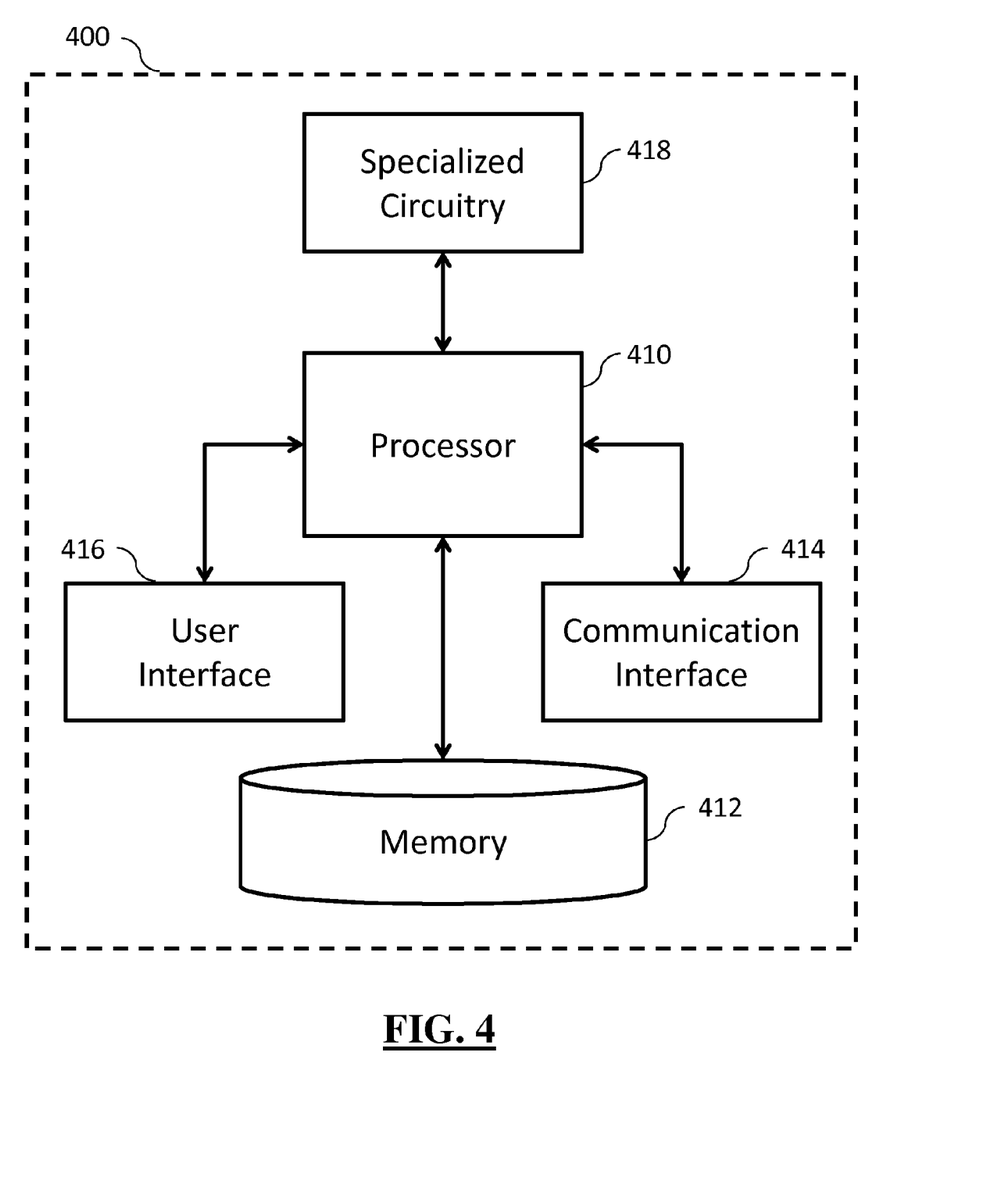
FIG. 4 provides a schematic diagram of a generic apparatus according to an embodiment of the present invention.

FIG. 2 provides a flowchart according to an example method for retrieving a customer check. The operations performed by a method, apparatus, and computer program product of this example embodiment are illustrated from the perspective of an apparatus 400 embodied as a mobile device 12. The apparatus 400 embodied by the mobile device 12 may comprise means, such as the specialization circuitry 418, the processor 410, or the like. In this example embodiment, the various operations may be performed by the specialized circuitry 418 embodied as check retrieval circuitry. At operation 200, the example method may comprise generating a list of items included on at least one open check. The example method may further comprise receiving from a customer a selection of an item from the list, wherein the item is included on a check associated with the customer at operation 210. At operation 220, the example method may further comprise identifying the check associated with the customer based at least in part on the selected item.

Figure 3:
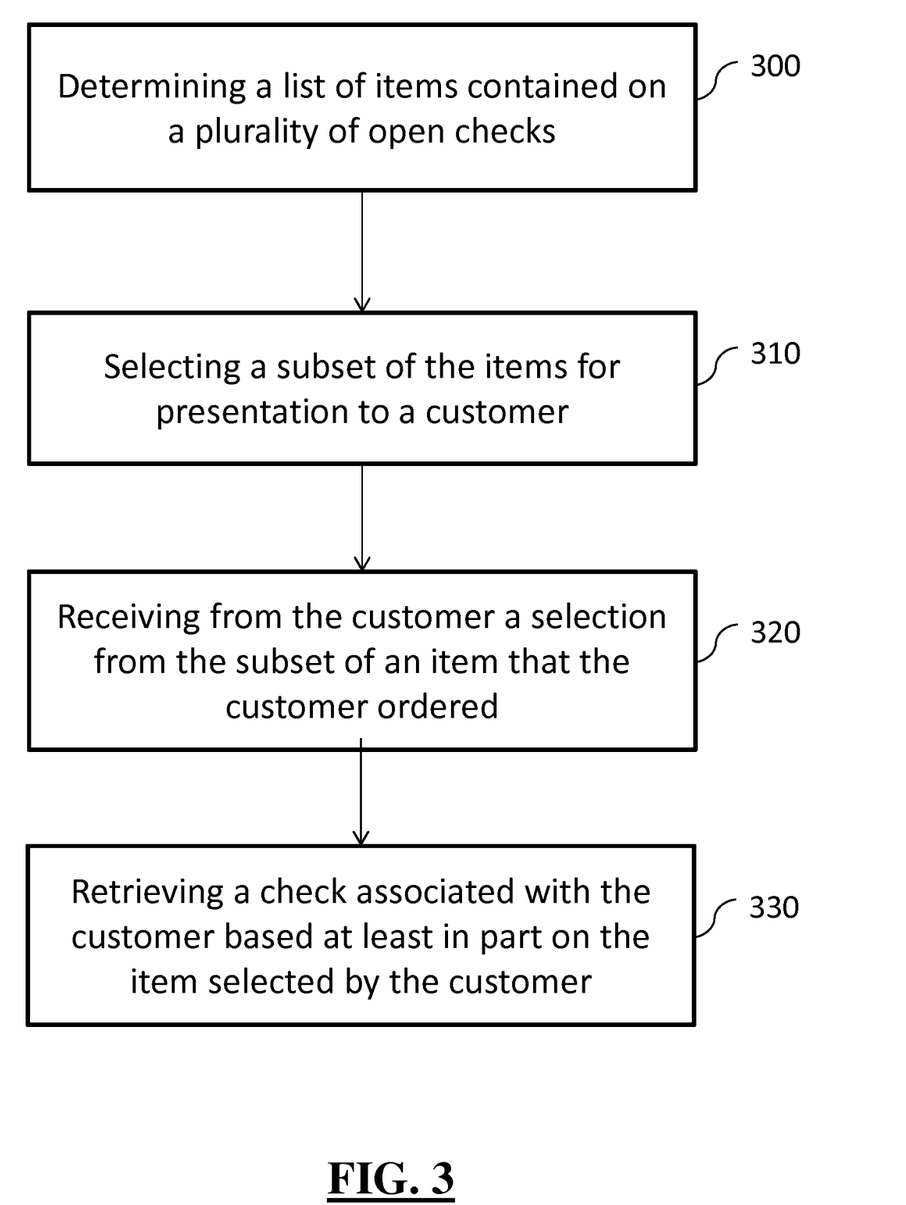
FIG. 3 provides a flowchart for retrieving a customer check according to an embodiment of the present invention.

FIG. 3 provides a flowchart according to an example method for retrieving a customer check. The operations performed by a method, apparatus, and computer program product of this example embodiment are illustrated from the perspective of an apparatus 400 embodied as mobile device 12. The apparatus 400 embodied by the mobile device 12 may comprise means, such as the specialization circuitry 418, the processor 410, or the like. In this example embodiment, the various operations may be performed by the specialization circuitry 418 embodied as check retrieval circuitry. At operation 300, the example method may comprise determining a list of items contained on a plurality of open checks. The example method may further comprise selecting a subset of the items for presentation to a customer at operation 310. At operation 320, the example method may further comprise receiving from the customer a selection from the subset of an item that the customer ordered. The example method may further comprise retrieving a check associated with the customer based at least in part on the item selected by the customer at operation 330.

Various embodiments provide numerous benefits and advantages to both customers and merchants.

Some advantageous embodiments enable customer to retrieve their checks at a retail or restaurant establishment. In this regard, a customer does not need to be given access to all of the open checks at the establishment to select his own check, thus protecting the privacy of the other open checks. Instead, a customer selects items from a list that appear on the customer's check and based on the customer input the mobile device can retrieve the check.

In certain advantageous embodiments, when selecting the items to present to customers to help them find their checks the mobile device may select items most likely to find the check with as little input from the customer as possible. In this regard, a customer need not remember every single item he has ordered to find a check, but may do so simply by selecting from a list of the most common items or most expensive items that the customer is most likely to remember ordering.

In various advantageous embodiments, the mobile device may protect against inappropriate access of the open checks of the establishment. In some embodiments, the mobile device may include dummy entries on the list of items presented to the customer. If a customer selects one of the dummy items, the mobile device may alert the establishment that someone may be trying to inappropriately access a check. In other embodiments, the mobile device may determine the customer's location and prevent that customer from accessing any checks if the customer is located beyond a threshold distance from the establishment or not inside the establishment.

The operations of the methods described herein may be carried out in any suitable order, or simultaneously where appropriate. The methods described herein may be performed by software in machine readable form on a tangible storage medium or as a propagating signal.

In various embodiments, a mobile device 12, terminal 14, and/or a server 16 may be embodied as or otherwise include an apparatus 400 as generically represented by the block diagram of FIG. 4. In the example embodiment, the apparatus 400 may comprise various means for performing the various functions herein described. These means may comprise one or more of a processor 410, memory 412, communication interface 414, user interface 416, or specialized circuitry 418. The various means may be in communication with one another, such as via a bus.

The means of the apparatus 400 as described herein may be embodied as, for example, circuitry, hardware elements (e.g., a suitably programmed processor, combinational logic circuit, and/or the like), a computer program product comprising computer-readable program instructions (e.g., software or firmware) stored on a computer-readable medium (e.g., memory 412) that is executable by a suitably configured processing device (e.g., the processor 410), or some combination thereof. In some example embodiments, the processor 410, memory 412, communication interface 414, user interface 416, and/or specialized circuitry 418 may be embodied as a chip or chip set.

The processor 410 may, for example, be embodied as various means including circuitry, one or more microprocessors with accompanying digital signal processor(s), one or more processor(s) without an accompanying digital signal processor, one or more coprocessors, one or more multi-core processors, one or more controllers, one or more computers, various other processing elements including integrated circuits such as, for example, an ASIC (application specific integrated circuit) or FPGA (field programmable gate array), one or more other hardware processors, or some combination thereof. Although illustrated in FIG. 4 as a single processor, in some embodiments the processor 410 may comprise a plurality of processors. The plurality of processors may be in operative communication with each other and may be collectively configured to perform one or more functionalities of the apparatus 400 as described herein. The plurality of processors may be embodied on a single device or distributed across a plurality of devices collectively configured to function as the apparatus 400.

In some example embodiments, the processor 410 may be configured to execute instructions stored in the memory 412 or memory otherwise accessible to the processor 410. These instructions, when executed by the processor 410, may cause the apparatus 400 to perform one or more of the functionalities of the apparatus 400 as described herein. Further, the processor 410 may comprise functionality to operate one or more software programs, which may be stored in memory. For example, the processor 410 may be capable of operating a connectivity program, such as a web browser. The connectivity program may allow the apparatus 400 to transmit and receive web content, such as location-based content, according to a protocol, such as Wireless Application Protocol (WAP), hypertext transfer protocol (HTTP), and/or the like. The apparatus 400 may be capable of using protocol(s), such as Transmission Control Protocol/Internet Protocol (TCP/IP), to transmit and receive web content across the internet or other networks.

The memory 412 may comprise, for example, volatile memory, non-volatile memory, or some combination thereof. In this regard, the memory 412 may comprise one or more tangible and/or non-transitory computer-readable storage media that may include volatile and/or non-volatile memory. Although illustrated in FIG. 4 as a single memory, the memory 412 may comprise a plurality of memories. The plurality of memories may be embodied on a single device or may be distributed across a plurality of devices collectively configured to function as the apparatus 400. In various example embodiments, the memory 412 may comprise a magnetic storage device (e.g., hard disk), dynamic and/or static random access memory (RAM), read only memory (ROM), cache memory, flash memory, optical disc, subscriber identity module (SIM), removable user identity module (R-UIM), circuitry configured to store information, or some combination thereof. The memory 412 may be configured to store information, data, applications (e.g., software programs), instructions, and/or the like, in some instances for execution by the processor 410, for enabling the apparatus 400 to carry out various functions in accordance with various example embodiments.

The communication interface 414 may be embodied as any device or means embodied in circuitry, hardware, a computer program product comprising computer readable program instructions stored on a computer readable medium (for example, the memory 412) and executed by a processing device (for example, the processor 410), or a combination thereof that is configured to receive and/or transmit data from/to another computing device. The communication interface 414 may include, for example, an antenna, a transmitter, a receiver, a transceiver, and/or supporting hardware or software for enabling communications with one or more remote devices. The communication interface 414 may be configured to receive and/or transmit data using any protocol that may be used for communications between devices.

The user interface 416 may be in communication with the processor 410 to receive an indication of a user input and/or to provide an audible, visual, mechanical, or other output to a user. As such, the user interface 416 may include, for example, a keyboard, keypad, scanner, printer, mouse, joystick, display (e.g., touch screen display), microphone, speaker, and/or other input/output mechanisms. The processor 410 and/or user interface circuitry comprising the processor 410 may be configured to control one or more functions of the user interface 416 through computer program instructions (e.g., software and/or firmware) stored on memory (e.g., memory 412) accessible to the processor 410.

The specialized circuitry 418 may be embodied as various means, such as circuitry, hardware, a computer program product comprising computer readable program instructions stored on a computer readable medium (for example, the memory 412) and executed by a processing device (for example, the processor 410), or some combination thereof and, in some embodiments, is embodied as or otherwise controlled by the processor 410.

Many modifications and other embodiments of the inventions set forth herein will come to mind to one skilled in the art to which these inventions pertain having the benefit of the teachings presented in the foregoing descriptions and the associated drawings. Therefore, it is to be understood that the embodiments of the invention are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions other than those explicitly described above are also contemplated as may be set forth in some of the appended claims. Although specific terms are employed herein, they are used in a generic and descriptive sense only and not for purposes of limitation.

What is claimed is:

1. A method comprising:
   generating, by a mobile device, a list of items that have been ordered on all open checks at an establishment in response to submitting a request for the open checks that includes a name and address of the establishment where the mobile device is located, and wherein each item includes a frequency with which that item appears on the open checks;
   receiving from a customer operating the mobile device a selection of an item from the list as an indication that the customer is attempting to identify a check associated with a customer open order for the customer at the establishment, and wherein the item selected is included on the check associated with the customer; and
   identifying the check associated with the customer based at least in part on the selected item and based on a location of the mobile device resolved by the mobile device and the name and address of the establishment and providing the check to the mobile device for review and action by the customer.

2. The method of claim 1, wherein identifying the check further comprises:
   determining that the selected item is insufficient to identify the check;
   receiving from the customer a selection of an additional item from the list, wherein the additional item is included on the check associated with the customer; and
   identifying the check associated with the customer based at least in part on the selected additional item.

3. The method of claim 2, further comprising:
   modifying the list based at least in part on the selected item, prior to receiving from the customer the selection of the additional item.

4. The method of claim 1, wherein the list of items comprises at least one item unique to a single open check.

5. The method of claim 4, further comprising:
   excluding from the list any items included on each of the open checks.

6. The method of claim 1, wherein the list of items comprises at least one item not included on any of the open checks.

7. The method of claim 1, wherein the check is identified prior to the customer selecting every item on the check.

8. The method of claim 1, wherein generating the list of items further comprises:
   selecting the items appearing most frequently on the open checks.

9. The method of claim 1, further comprising:
   determining that the check associated with the customer is identical to another open check; and
   generating an alert that the checks are identical.

10. A method comprising:
    determining, by a mobile device, a list of items contained on all open checks at an establishment in response to submitting a request for the open checks that includes a name and address of the establishment where the mobile device is located, wherein each item includes a frequency with which that item appears on the open checks;
    selecting a subset of the items for presentation to a customer;
    receiving from the customer operating the mobile device a selection from the subset of an item that the customer ordered as an indication that the customer is attempting to identify a check associated with a customer open order for the customer at the establishment; and
    retrieving the check associated with the customer based at least in part on the item selected by the customer and based on a location of the mobile device resolved by the mobile device and providing the check to the mobile device for review and action by the customer.

11. The method of claim 10, wherein selecting a subset further comprises ignoring items that are included on each of the plurality of open checks.

12. The method of claim 10, wherein retrieving the check further comprises:

determining that the selection is insufficient to identify the check;

receiving from the customer a selection of an additional item from the subset, wherein the additional item is included on the check associated with the customer; and retrieving the check based at least in part on the selected additional item.

13. The method of claim 12, further comprising:

modifying the subset based at least in part on the selection of the item, prior to receiving from the customer the selection of the additional item.

14. The method of claim 10, wherein the retrieved check is identified prior to the customer selecting every item the customer ordered.

15. The method of claim 10, wherein the list of items comprises at least one item unique to a single open check.

16. The method of claim 10, wherein generating the list of items further comprises:

selecting the most expensive items appearing on the open checks.

17. A system comprising:

a database for storing all open checks at an establishment;

a device for finding a check associated with a customer from the open checks;

wherein the device is configured to:

analyze items included on the open checks and determine representative items for facilitating the search for a particular check based at least in part on a request from the customer for all the open checks that includes a name and address of the establishment and each item includes a frequency with which that item appears on the open checks;

receive input from the customer identifying a representative item included on the check of the customer, the input received as a search request for the customer to locate the check of the customer; and retrieve the check associated with the customer from the database using the input from the customer and based on a location of a mobile device operated by a customer communicated with the input and provide the check to the mobile device of the customer for customer review and action with respect to the check.

18. The system of claim 17, wherein in order to retrieve the check, the device is further configured to:

determine that the input is insufficient to identify the check;

receive from the customer input identifying an additional item from the subset, wherein the additional item is included on the check of the customer; and retrieve the check based at least in part on the selected additional item.

19. The system of claim 17, wherein in order to determine representative items, the device is further configured to:

exclude from the list any items included on each of the open checks.

20. The system of claim 19, wherein the device is further configured to:

determine that the check associated with the customer is identical to another open check; and generate an alert that the checks are identical.

* * * * *